(12) United States Patent
Cai et al.

(10) Patent No.: US 9,650,552 B2
(45) Date of Patent: May 16, 2017

(54) ENERGY CURABLE SEALANTS

(71) Applicant: PRC-DeSoto International, Inc., Sylmar, CA (US)

(72) Inventors: Juexiao Cai, Stevenson Ranch, CA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 294 days.

(21) Appl. No.: 13/833,964

(22) Filed: Mar. 15, 2013

(65) Prior Publication Data

US 2014/0272287 A1 Sep. 18, 2014

(51) Int. Cl.

| | | |
|---|---|---|
| *C09K 3/10* | (2006.01) | |
| *C08G 59/04* | (2006.01) | |
| *C08G 59/50* | (2006.01) | |
| *C08G 75/00* | (2006.01) | |
| *C08G 75/02* | (2016.01) | |
| *C08L 63/00* | (2006.01) | |
| *C08L 81/00* | (2006.01) | |
| *C08G 59/18* | (2006.01) | |

(52) U.S. Cl.
CPC .......... *C09K 3/1012* (2013.01); *C08G 59/188* (2013.01); *C08G 59/50* (2013.01); *C08G 75/00* (2013.01); *C08G 75/02* (2013.01); *C08L 63/00* (2013.01); *C08L 81/00* (2013.01); *Y10T 428/24331* (2015.01)

(58) Field of Classification Search
USPC .......................... 428/138; 427/386; 523/435
See application file for complete search history.

(56) References Cited

U.S. PATENT DOCUMENTS

| | | | |
|---|---|---|---|
| 4,626,471 A | 12/1986 | Chao | |
| 5,015,527 A | 5/1991 | Chao | |
| 5,760,106 A * | 6/1998 | Pinnavaia et al. | 523/209 |
| 6,172,179 B1 | 1/2001 | Zook et al. | |
| 2005/0010003 A1 | 1/2005 | Sawant et al. | |
| 2006/0073334 A1 * | 4/2006 | Schwantes et al. | 428/402.2 |
| 2006/0175005 A1 * | 8/2006 | Sawant et al. | 156/307.1 |
| 2007/0054128 A1 * | 3/2007 | Walker et al. | 428/413 |
| 2007/0270549 A1 * | 11/2007 | Szymanski | C08G 18/3234 525/123 |
| 2008/0224098 A1 | 9/2008 | Tang et al. | |
| 2012/0040104 A1 | 2/2012 | Keledjian et al. | |

FOREIGN PATENT DOCUMENTS

| | | |
|---|---|---|
| JP | 2003-194032 A | 7/2003 |
| JP | 2003-317826 A | 11/2003 |
| JP | 2004-164910 A | 6/2004 |
| JP | 2006-028254 A | 2/2006 |
| JP | 2007-127202 A | 5/2007 |
| WO | 98/39365 A2 | 9/1998 |
| WO | 2004/067635 A1 | 8/2004 |

OTHER PUBLICATIONS

Blaiszik et al. "Microcapsules filled with reactive 990-997). solutions for self-healing materials," Polymer, Elsevier Sci. Publi. (2009), pp. 990-997).*
Blaiszik, B. J. et al., "Microcapsules filled with reactive solutions for self-healing materials"; Polymer; Feb. 9, 2009; pp. 990-997; vol. 50, No. 4; Elsevier Ltd.
Jin, Henghua et al., "Self-healing thermoset using encapsulated epoxy-amine healing chemistry"; Polymer; 2012; pp. 1-7; Elsevier Ltd.
Rochmadi, Agus Prasetya et al., "Mechanism of Microencapsulation with Urea-Formaldehyde Polymer"; American Journal of Applied Sciences; 2010; pp. 739-745; vol. 7, No. 6; Science Publications.
Yuan, Li et al., "Thermal stability of microencapsulated epoxy resins with poly(urea-formaldehyde)"; Polymer Degradation and Stability; Oct. 1, 2006; pp. 2300-2306; vol. 91, No. 10; Elsevier Ltd.
Materials Safety Data Sheet, MSDS 8138, for Lipocapsules® LTI-8138, Dec. 8, 2010, pp. 1-5.
Clark, Leslie J. et al., "Use of Permapol P3.1 polymers and epoxy resins in the formulation of aerospace sealants"; International Journal of Adhesion & Adhesives; Dec. 18, 2002; pp. 343-348; vol. 23 (2003); Elsevier Ltd.

\* cited by examiner

*Primary Examiner* — Randy Gulakowski
*Assistant Examiner* — Ha S Nguyen
(74) *Attorney, Agent, or Firm* — William R. Lambert

(57) ABSTRACT

Curable compositions containing thiol-terminated polythioethers and encapsulated polyepoxy curing agents are disclosed. The compositions exhibit extended pot life.

16 Claims, No Drawings

ENERGY CURABLE SEALANTS

FIELD

The present disclosure relates to curable compositions containing a thiol-terminated polythioether and an encapsulated polyepoxy curing agent. The compositions are useful in aerospace sealant applications where the compositions exhibit extended pot life and can be cured upon exposure to heat and/or mechanical stress.

BACKGROUND

Sealants useful in aerospace and other applications must satisfy demanding mechanical, chemical, and environmental requirements. The sealants can be applied to a variety of surfaces including metal surfaces, primer coatings, intermediate coatings, finished coatings, and aged coatings. In sealants such as those described in U.S. Pat. No. 6,172,179 thiol-terminated polythioethers and polyepoxy curing agents are reacted to provide cured aerospace sealants.

In practice, sealant compositions can be provided as two-part compositions in which the thiol-terminated polythioethers and the polyepoxy are provided as separate components, with the base catalyst in the polythioether component. Alternatively, the base catalyst may be provided as a third component, and the component containing the thiol-terminated polythioether, the component containing the polyepoxy, and the component containing the base catalyst are mixed shortly before use. However, once the components are mixed, the reaction proceeds, and depending at least in part on the temperature and on the type of base catalyst, the pot life is limited to less than 12 hours.

Ways to prolong the pot life of thiol-terminated polythioether compositions employing epoxy curing chemistries are desired.

SUMMARY

In a first aspect, compositions are provided comprising (a) a thiol-terminated polythioether; (b) an encapsulated polyepoxy; and (c) an amine catalyst.

In a second aspect, compositions formulated as a sealant are provided comprising (a) a thiol-terminated polythioether; (b) an encapsulated polyepoxy; and (c) an amine catalyst.

In a third aspect, methods of sealing an aperture are provided comprising (a) applying a sealant composition comprising a thiol-terminated polythioether and an encapsulated polyepoxy to one or more surfaces defining an aperture; and (b) applying a stress to release the polyepoxy from the encapsulant.

In a fourth aspect, apertures sealed with a sealant composition of the present disclosure are provided.

Reference is now made to certain embodiments of compositions and methods. The disclosed embodiments are not intended to be limiting of the claims.

To the contrary, the claims are intended to cover all alternatives, modifications, and equivalents.

DETAILED DESCRIPTION

Definitions

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

A dash ("-") that is not between two letters or symbols is used to indicate a point of bonding for a substituent or between two atoms. For example, $—CONH_2$ is bonded to another chemical moiety through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methanediyl ($—CH_2—$), ethane-1,2-diyl ($—CH_2CH_2—$), propane-1,3-diyl and iso-propane-1,2-diyl (e.g., $—CH_2CH_2CH_2—$ and $—CH(CH_3)CH_2—$), butane-1,4-diyl ($—CH_2CH_2CH_2CH_2—$), pentane-1,5-diyl ($—CH_2CH_2CH_2CH_2CH_2—$), hexane-1,6-diyl ($—CH_2CH_2CH_2CH_2CH_2CH_2—$), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkenyl" group refers to a group $(R)_2C=C(R)_2$. In certain embodiments, an alkenyl group has the structure —RC=C(R)$_2$ where the alkenyl group is a terminal group and is bonded to a larger molecule. In such embodiments, each R may be selected from, for example, hydrogen and $C_{1-3}$ alkyl. In certain embodiments, each R is hydrogen and an alkenyl group has the structure —CH=CH$_2$.

"Alkoxy" refers to a —OR group where R is alkyl as defined herein. Examples of alkoxy groups include methoxy, ethoxy, n-propoxy, isopropoxy, and n-butoxy. In certain embodiments, the alkoxy group is $C_{1-8}$ alkoxy, $C_{1-6}$ alkoxy, $C_{1-4}$ alkoxy, and in certain embodiments, $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. In certain embodiments, the alkyl group is $C_{2-6}$ alkyl, $C_{2-4}$ alkyl, and in certain embodiments, $C_{2-3}$ alkyl. Examples of alkyl groups include methyl, ethyl, n-propyl, iso-propyl, n-butyl, iso-butyl, tert-butyl, n-hexyl, n-decyl, tetradecyl, and the like. In certain embodiments, the alkyl group is $C_{2-6}$ alkyl, $C_{2-4}$ alkyl, and in certain embodiments, $C_{2-3}$ alkyl. It will be appreciated that a branched alkyl has at least three carbon atoms.

"Cycloalkanediyl" refers to a diradical saturated monocyclic or polycyclic hydrocarbon group. In certain embodiments, the cycloalkanediyl group is $C_{3-12}$ cycloalkanediyl, $C_{3-8}$ cycloalkanediyl, $C_{3-6}$ cycloalkanediyl, and in certain embodiments, $C_{5-6}$ cycloalkanediyl. Examples of cycloalkanediyl groups include cyclohexane-1,4-diyl, cyclohexane-1,3-diyl, and cyclohexane-1,2-diyl.

"Cycloalkyl" refers to a saturated monocyclic or polycyclic hydrocarbon monoradical group. In certain embodiments, the cycloalkyl group is $C_{3-12}$ cycloalkyl, $C_{3-8}$ cycloalkyl, $C_{3-6}$ cycloalkyl, and in certain embodiments, $C_{5-6}$ cycloalkyl.

"Heterocycloalkanediyl" refers to a cycloalkanediyl group in which one or more of the carbon atoms are replaced with a heteroatom, such as N, O, S, or P. In certain embodiments of heterocycloalkanediyl, the heteroatom is selected from N and O.

Curable thiol-terminated polythioether compositions having extended pot life are disclosed. In these systems, the polyepoxy curing agent is protected or encapsulated within a microcapsule and dispersed in the composition containing a thiol-terminated polythioether and a base catalyst. Upon exposure, for example, to elevated temperature and/or mechanical stress, the polyepoxy is released from the encapsulant and reacts with the thiol-terminated polythioether to form a cured composition. In certain embodiments, systems provide a pot life greater than at least 24 hours.

Encapsulated Curing Agent

Compositions provided by the present disclosure include a thiol-terminated polythioether, an encapsulated polyepoxy curing agent, and a base catalyst. The one-part compositions have a pot life of at least 24 hours, at least 3 days, at least 1 week, at least two weeks, and in certain embodiments, at least 4 weeks. Pot life refers to the time during which the composition remains workable such that the composition can be applied to seal surfaces. The polyepoxy curing agent can be released from the encapsulant upon application of elevated temperature, mechanical stress, and/or ultrasonication. Upon release from the encapsulant, the polyepoxy curing agent reacts with the thiol-terminated polythioethers to form a cured sealant composition.

Polyepoxy curing agents can be encapsulated in a microcapsule as a solution or entrapped within a porous substrate such as matrix encapsulant materials.

Encapsulated polyepoxy resins are described, for example, in Yuan et al., *Polymer Degradation and Stability*, 2006, 91, 2300-2306; Blaiszik et al., *Polymer*, 2009, 50, 990-997; and Jin et al., *Polymer*, 2011.12.005, and are used in self-healing polymer systems. Microcapsules containing epoxy resins such as Epon® 815C and Epon® 828 can be prepared by in situ polymerization of urea-formaldehyde (UF). Microcapsules can have a diameter, for example, from about 100 μm to about 300 μm, from about 150 μm to about 250 μm, or other dimensions. Microencapsulated epoxies are commercially available and include a LT-81380, (Lipo Technologies). Within the microcapsule, the epoxy resin may be suspended in a non-aqueous solvent such as hexane or dissolved in an aqueous solvent.

For aerospace sealant applications, the epoxy can be released from the microcapsule by exposure to elevated temperature and/or to mechanical energy. The mechanical stress can include, for example, impact force, shear force, grinding force, and/or ultrasonic force. The epoxy can be released from the microcapsule at a temperature less than about 50° C., less than about 70° C., less than about 80° C., and in certain embodiments, less than about 100° C. It is desirable that the epoxy be released at lower temperatures but above room temperature. The release temperature can be determined, for example, by the chemical composition of the polymeric matrix. The rate at which the sealant composition cures after the epoxy curing agent is released from the microcapsules can be determined by the degree of dispersion of the microcapsules within the sealant composition. Examples of suitable epoxies for use in sealant compositions provided by the present disclosure include, for example, polyepoxies such as hydantoin diepoxide, diglycidyl ethers of bisphenol-A such as Epon® 828 (Resolution Performance Products, LLC), diglycidyl ether of bisphenol-F, Novolac® type epoxides such as DEN® 438 (available from Dow), certain epoxidized unsaturated resins, and combinations of any of the foregoing. In certain embodiments, a polyepoxy includes a dimer acid-based polyepoxy reactive resin such as disclosed, for example, in U.S. Publication No. 2009/0326167. In certain embodiments, suitable curing agents include hydantoin diepoxide, diglycidyl ether of bisphenol-A such as Epon® 828 (Resolution Performance Products, LLC), diglycidyl ether of bisphenol-F, Novolac-type epoxides such as DEN® 431 (Dow Plastics), epoxidized unsaturated phenolic resins, and dimer acid-based epoxy resins. In certain embodiments, a polyepoxy curing agent has a molecular weight from about 100 Daltons to 2,500 Daltons, from about 200 Daltons to about 2,000 Daltons, from about 400 Daltons to about 1,500 Daltons, and in certain embodiments from about 500 Daltons to 1,000 Daltons.

A polyepoxide refers to a compound having two or more reactive epoxy groups or a combination thereof.

In certain embodiments, a polyepoxy curing agent comprises an epoxy-functional prepolymer. Examples of suitable epoxy-functional prepolymers include the epoxy-functional polyformal compounds disclosed in U.S. patent application Ser. No. 13/050,988 and epoxy-functional polythioether compounds disclosed in U.S. Pat. No. 7,671,145. In general, when used as a curing agent, an epoxy-functional prepolymer has a molecular weight less than about 2,000 Daltons, less than about 1,500, Daltons, less than about 1,000 Daltons, and in certain embodiments, less than about 500 Daltons.

In certain embodiments, an epoxy curing agent comprises about 0.5 wt % to about 20 wt % of the composition, from about 1 wt % to about 10 wt %, from about 2 wt % to about 8 wt %, from about 2 wt % to about 6 wt %, and in certain embodiments, from about 3 wt % to about 5 wt %, where wt % is based on the total solids weight of the composition.

Thiol-Terminated Polythioethers

Examples of thiol-functional polythioethers are disclosed, for example in U.S. Pat. No. 6,172,179. In certain embodiments, a thiol-terminated polythioether polymer comprises Permapol® P3.1E, available from PRC-DeSoto International Inc., Sylmar, Calif. Other examples of thiol-terminated polythioethers are disclosed in U.S. Application Publication No. 2011/0060091.

In certain embodiments, a thiol-functional polythioether comprises:

(a) a backbone comprising the structure of Formula (1):

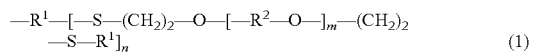

wherein:
(i) each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a $—[(—CHR^3—)_s—X—]_q—(CHR^3)_r—$ group, wherein each $R^3$ is selected from hydrogen and methyl;
(ii) each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a $—[(—CH_2—)_s—X—]_q—(CH_2)_r—$ group;
(iii) each X is independently selected from O, S, and a $—NR^6—$ group, in which $R^6$ is selected from H and a methyl group;
(iv) m ranges from 0 to 50;
(v) n is an integer ranging from 1 to 60;
(vi) s is an integer ranging from 2 to 6;
(vii) q is an integer ranging from 1 to 5; and
(viii) r is an integer ranging from 2 to 10.

In certain embodiments, a thiol-terminated polythioether comprises a thiol-terminated polythioether selected from a thiol-terminated polythioether of Formula (2), a thiol-terminated polythioether of Formula (2a), and a combination thereof:

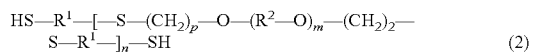

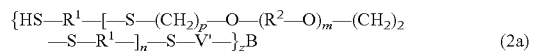

wherein:
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(—CHR^3—)_s—X—]_q—(—CHR^3—)_r—$, wherein:
s is an integer from 2 to 6;
q is an integer from 1 to 5;
r is an integer from 2 to 10;
each $R^3$ is independently selected from hydrogen and methyl; and
each X is independently selected from $—O—$, $—S—$, and $—NR—$, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined as for $R^1$;
m is an integer from 0 to 50;
n is an integer from 1 to 60;
p is an integer from 2 to 6;
B represents a core of a z-valent, vinyl-terminated polyfunctionalizing agent $B(—V)_z$ wherein:
z is an integer from 3 to 6; and
each V is a group comprising a terminal vinyl group; and each $—V'—$ is derived from the reaction of $—V$ with a thiol.

In certain embodiments of Formula (2) and Formula (2a), $R^1$ is $—[(—CH_2—)_s—X—]_q—(CH_2)_r—$, where s is 2, X is $—O—$, q is 2, r is 2, $R^2$ is ethanediyl, m is 2, and n is 9.

In certain embodiments of Formula (2) and Formula (2a), $R^1$ is selected from $C_{2-6}$ alkanediyl and $—[—(CHR^3)_s—X—]_q—(CHR^3)_r—$.

In certain embodiments of Formula (2) and Formula (2a), $R^1$ is $—[—(CHR^3)_s—X—]_q (CHR^3)_r—$, and in certain embodiments X is $—O—$ and in certain embodiments, X is $—S—$.

In certain embodiments of Formula (2) and Formula (2a), where $R^1$ is $—[—(CHR^3)_s—X—]_q—(CHR^3)_r—$, s is 2, r is 2, q is 1, and X is $—S—$; in certain embodiments, wherein p is 2, q is 2, r is 2, and X is $—O—$; and in certain embodiments, s is 2, r is 2, q is 1, and X is $—O—$.

In certain embodiments of Formula (2) and Formula (2a), where $R^1$ is $—[—(CHR^3)_s—X—]_q—(CHR^3)_r—$, each $R^3$ is hydrogen, and in certain embodiments, at least one $R^3$ is methyl.

In certain embodiments of Formula (2) and Formula (2a), each $R^1$ is the same, and in certain embodiments, at least one $R^1$ is different.

Various methods can be used to prepare thiol-terminated polythioethers of Formula (2) and Formula (2a). Examples of suitable thiol-terminated polythioether polymers, and methods for their production, are described in U.S. Pat. No. 6,172,179 at col. 2, line 29 to col. 4, line 22; col. 6, line 39 to col. 10, line 50; and col. 11, lines 65 to col. 12, line 22, the cited portions of which are incorporated herein by reference. Such thiol-terminated polythioethers may be difunctional, that is, linear polymers having two thiol terminal groups, or polyfunctional, that is, branched polymers have three or more thiol terminal groups. Suitable thiol-terminated polythioethers are commercially available, for example, as Permapol® P3.1E, from PRC-DeSoto International Inc., Sylmar, Calif.

Suitable thiol-terminated polythioethers may be produced by reacting a divinyl ether or mixtures of divinyl ethers with an excess of dithiol or a mixtures of dithiols. For example, dithiols suitable for use in preparing thiol-terminated polythioethers include those having Formula (3), other dithiols disclosed herein, or combinations of any of the dithiols disclosed herein.

In certain embodiments, a dithiol has the structure of Formula (3):

wherein:
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $—[—(CHR^3)_s—X—]_q—(CHR^3)_r—$;
wherein:
each $R^3$ is independently selected from hydrogen and methyl;
each X is independently selected from —O—, —S—, and —NR— wherein R is selected from hydrogen and methyl;
s is an integer from 2 to 6;
q is an integer from 1 to 5; and
r is an integer from 2 to 10.

In certain embodiments of a dithiol of Formula (3), $R^1$ is $—[—(CHR^3)_s—X—]$, $—(CHR^3)_r—$.

In certain embodiments of a compound of Formula (3), X is selected from —O— and —S—, and thus $—[—(CHR^3)_s—X—]_q—(CHR^3)_r—$ in Formula (3) is $—[(—CHR^3—)_s—O—]_q—(CHR^3)_r—$ or $—[(—CHR^3_2—)_s—S—]_q—(CHR^3)_r—$. In certain embodiments, s and r are equal, such as where s and r are both two.

In certain embodiments of a dithiol of Formula (3), $R^1$ is selected from $C_{2-6}$ alkanediyl and $—[—(CHR^3)_s—X—]_q—(CHR^3)_r—$.

In certain embodiments, $R^1$ is $—[—(CHR^3)_s—X—]_q—(CHR^3)_r—$, and in certain embodiments X is —O—, and in certain embodiments, X is —S—.

In certain embodiments where $R^1$ is $—[—(CHR^3)_s—X—]$, $—(CHR^3)_r—$, s is 2, r is 2, q is 1, and X is —S—; in certain embodiments, wherein s is 2, q is 2, r is 2, and X is —O—; and in certain embodiments, s is 2, r is 2, q is 1, and X is —O—.

In certain embodiments where $R^1$ is $—[—(CHR^3)_s—X—]_q—(CHR^3)_r—$, each $R^3$ is hydrogen, and in certain embodiments, at least one $R^3$ is methyl.

Examples of suitable dithiols include, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendant groups selected from a lower (e.g., $C_{1-6}$) alkyl group, a lower alkoxy group, and a hydroxyl group. Suitable alkyl pendant groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (3), $R^1$ is $—[(—CH_2—)_s—X—]_q—(CH_2)—$, wherein s is 2, r is 2, q is 1, and X is —S—); dimercaptodioxaoctane (DMDO) (in Formula (3), $R^1$ is $—[(—CH_2—)_s—X—]_q—(CH_2)_r—$, wherein s is 2, q is 2, r is 2, and X is —O—); and 1,5-dimercapto-3-oxapentane (in Formula (3), $R^1$ is $—[(—CH_2—)_s—X—]$, $—(CH_2)_r—$, wherein s is 2, r is 2, q is 1, and X is —O—). It is also possible to use dithiols that include both heteroatoms in the carbon backbone and pendant alkyl groups, such as methyl groups. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CHCH$_3$CH$_2$—SH and HS—CH(CH$_3$)CH$_2$—S—CH$_2$CH(CH$_3$)—SH.

Suitable divinyl ethers for preparing polythioethers and polythioether adducts include, for example, divinyl ethers of Formula (4):

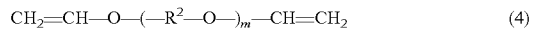

where $R^2$ in Formula (4) is selected from a $C_{2-6}$ n-alkanediyl group, a $C_{3-6}$ branched alkanediyl group, a $C_{6-8}$ cycloalkanediyl group, a $C_{6-10}$ alkanecycloalkanediyl group, and $—[(—CH_2—)_s—O—]—(—CH_2—)_r—$, where s is an integer ranging from 2 to 6, q is an integer from 1 to 5, and r is an integer from 2 to 10. In certain embodiments of a divinyl ether of Formula (4), $R^2$ is a $C_{2-6}$ n-alkanediyl group, a $C_{3-6}$ branched alkanediyl group, a $C_{6-8}$ cycloalkanediyl group, a $C_{6-10}$ alkanecycloalkanediyl group, and in certain embodiments, $—[(—CH_2—)_s—O—]_q—(—CH_2—)_r—$.

Suitable divinyl ethers include, for example, compounds having at least one oxyalkanediyl group, such as from 1 to 4 oxyalkanediyl groups, i.e., compounds in which m in Formula (4) is an integer ranging from 1 to 4. In certain embodiments, m in Formula (4) is an integer ranging from 2 to 4. It is also possible to employ commercially available divinyl ether mixtures that are characterized by a non-integral average value for the number of oxyalkanediyl units per molecule. Thus, m in Formula (4) can also take on rational number values ranging from 0 to 10.0, such as from 1.0 to 10.0, from 1.0 to 4.0, or from 2.0 to 4.0.

Examples of suitable divinyl ethers include, for example, divinyl ether, ethylene glycol divinyl ether (EG-DVE) ($R^2$ in Formula (4) is ethanediyl and m is 1), butanediol divinyl ether (BD-DVE) ($R^2$ in Formula (4) is butanediyl and m is 1), hexanediol divinyl ether (HD-DVE) ($R^2$ in Formula (4) is hexanediyl and m is 1), diethylene glycol divinyl ether (DEG-DVE) ($R^2$ in Formula (4) is ethanediyl and m is 2), triethylene glycol divinyl ether ($R^2$ in Formula (4) is ethanediyl and m is 3), tetraethylene glycol divinyl ether ($R^2$ in Formula (4) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendant groups selected from alkyl groups, hydroxyl groups, alkoxy groups, and amine groups.

In certain embodiments, divinyl ethers in which $R^2$ in Formula (4) is $C_{3-6}$ branched alkanediyl may be prepared by reacting a polyhydroxy compound with acetylene. Examples of divinyl ethers of this type include compounds in which $R^2$ in Formula (4) is an alkyl-substituted methanediyl group such as —CH(CH$_3$)— (for example Pluriol® blends such as Pluriol® E-200 divinyl ether (BASF Corp.), for which $R^2$ in Formula (4) is ethanediyl and m is 3.8) or an alkyl-substituted ethanediyl (for example —CH$_2$CH(CH$_3$)— such as DPE polymeric blends including DPE-2 and DPE-3, International Specialty Products).

Other useful divinyl ethers include compounds in which $R^2$ in Formula (4) is polytetrahydrofuryl (poly-THF) or polyoxyalkanediyl, such as those having an average of about 3 monomer units.

Two or more types of polyvinyl ether monomers of Formula (4) may be used. Thus, in certain embodiments, two dithiols of Formula (3) and one polyvinyl ether monomer of Formula (4), one dithiol of Formula (3) and two polyvinyl ether monomers of Formula (4), two dithiols of Formula (3) and two divinyl ether monomers of Formula (4), and more than two compounds of one or both Formula (3) and Formula (4), may be used to produce a variety of thiol-terminated polythioethers.

In certain embodiments, a polyvinyl ether monomer comprises 20 to less than 50 mole percent of the reactants used to prepare a thiol-terminated polythioether, and in certain embodiments, 30 to less than 50 mole percent.

In certain embodiments provided by the present disclosure, relative amounts of dithiols and divinyl ethers are selected to yield polythioethers having terminal thiol groups. Thus, a dithiol of Formula (3) or a mixture of at least two different dithiols of Formula (3), are reacted with of a divinyl ether of Formula (4) or a mixture of at least two different divinyl ethers of Formula (4) in relative amounts such that the molar ratio of thiol groups to vinyl groups is greater than 1:1, such as 1.1 to 2.0:1.0.

The reaction between compounds of dithiols and divinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. In certain embodiments, the catalyst does not comprise acidic or basic compounds, and does not produce acidic or basic compounds upon decomposition. Examples of free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts are alkyl peroxides, such as t-butyl peroxide. The reaction may also be effected by irradiation with ultraviolet light either with or without a cationic photoinitiating moiety.

Thiol-terminated polythioethers provided by the present disclosure may be prepared by combining at least one compound of Formula (3) and at least one compound of Formula (4) followed by addition of an appropriate catalyst, and carrying out the reaction at a temperature from 30° C. to 120° C., such as 70° C. to 90° C., for a time from 2 to 24 hours, such as 2 to 6 hours.

As disclosed herein, thiol-terminated polythioethers may comprise a polyfunctional polythioether, i.e., may have an average functionality of greater than 2.0. Suitable polyfunctional thiol-terminated polythioethers include, for example, those having the structure of Formula (5):

wherein: (i) A comprises, for example, a structure of Formula (1), (ii) B denotes a z-valent residue of a polyfunctionalizing agent; and (iii) z has an average value of greater than 2.0, and, in certain embodiments, a value between 2 and 3, a value between 2 and 4, a value between 3 and 6, and in certain embodiments, is an integer from 3 to 6.

Polyfunctionalizing agents suitable for use in preparing such polyfunctional thiol-terminated compounds include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed in U.S. Publication No. 2010/0010133 at paragraphs [0102]-[0105], the cited portion of which is incorporated herein by reference. Other useful polyfunctionalizing agents include trimethylolpropane trivinyl ether, and the polythiols described in U.S. Pat. Nos. 4,366,307; 4,609,762; and 5,225,472. Mixtures of polyfunctionalizing agents may also be used.

As a result, thiol-terminated polythioethers suitable for use in embodiments provided by the present disclosure may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be affected by factors such as stoichiometry, as will be understood by those skilled in the art.

Thiol-terminated polythioethers having a functionality greater than 2.0 may be prepared in a manner similar to the difunctional thiol-terminated polythioethers described in U.S. Publication No. 2010/0010133. In certain embodiments, polythioethers may be prepared by combining (i) one or more dithiols described herein, with (ii) one or more divinyl ethers described herein, and (iii) one or more polyfunctionalizing agents. The mixture may then be reacted, optionally in the presence of a suitable catalyst, to afford a thiol-terminated polythioether having a functionality greater than 2.0.

Thus, in certain embodiments, a thiol-terminated polythioether comprises the reaction product of reactants comprising:

(a) a dithiol of Formula (3):

wherein:
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_s-X-]_q-(CHR^3)_r-$;

wherein:
each $R^3$ is independently selected from hydrogen and methyl;
each X is independently selected from —O—, —S—, —NH—, and —NR— wherein R is selected from hydrogen and methyl;
s is an integer from 2 to 6;
q is an integer from 1 to 5; and
r is an integer from 2 to 10; and
(b) a divinyl ether of Formula (4):

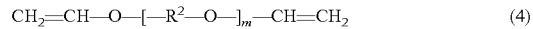

wherein:
each $R^2$ is independently selected from $C_{1-10}$ alkanediyl, $C_{6-8}$ cycloalkanediyl, $C_{6-14}$ alkanecycloalkanediyl, and $-[(-CHR^3-)_s-X-]_q-(-CHR^3-)_r-$, wherein s, q, r, $R^3$, and X are as defined above;
m is an integer from 0 to 50;
n is an integer from 1 to 60; and
is an integer from 2 to 6.

And, in certain embodiments, the reactants comprise (c) a polyfunctional compound such as a polyfunctional compound $B(-V)_z$, where B, —V, and z are as defined herein.

Thiol-terminated polythioethers provided by the present disclosure represent thiol-terminated polythioethers having a molecular weight distribution. In certain embodiments, useful thiol-terminated polythioethers can exhibit a number average molecular weight ranging from 500 Daltons to 20,000 Daltons, in certain embodiments, from 2,000 Daltons to 5,000 Daltons, and in certain embodiments, from 3,000 Daltons to 4,000 Daltons. In certain embodiments, useful thiol-terminated polythioethers exhibit a polydispersity ($M_w/M_n$; weight average molecular weight/number average molecular weight) ranging from 1 to 20, and in certain embodiments, from 1 to 5. The molecular weight distribution of thiol-terminated polythioethers may be characterized by gel permeation chromatography.

Compositions

In certain embodiments, compositions provided by the present disclosure include (a) a thiol-terminated polythioether; (b) an encapsulated polyepoxy; and (c) an amine catalyst. The thiol-terminated polythioether may be any of those disclosed herein, and the encapsulated polyepoxy can be a polyepoxy encapsulated within a polymeric shell, which is further encapsulated within a polymeric shell.

In certain embodiments, an amine catalyst may be a tertiary amine catalyst. Examples of suitable tertiary amine catalysts include, for example, N,N-dimethylethanolamine (DMEA), diaminobicyclooctane (DABCO), triethylene diamine (TEDA), bis(2-dimethylaminoethyl)ether (BD-MAEE), N-ethylmorpholine, N'N'-dimethylpiperazine, N,N, N', N', N''-pentamethyl-diethylene-triamine (PMDETA), N,N'-dimethylcyclohexylamine (DMCHA), N,N-dimethylbenzylamine (DMBA), N,N-dimethylcethylamine, N,N, N', N''', N''-pentamethyl-dipropylene-triamine (PMDPTA), triethylamine, and 1-(2-hydroxypropyl) imidazole. Other suitable amine catalysts include amidine catalysts such as tetramethyguanidine (TMG), dizabicyclononene (DBN), diazabicyclo undecene (DBU) and imidazoles; and bicyclic guanidines such as 1,5,7,-triazabicyclo[4.4.0]dec-5-ene (TBD) and 1,5,7, -triazabicyclo[4.4.0]dec-5-ene, 7-methyl (MTBD).

In certain embodiments, an amine catalyst is selected from DBU, DABCO, and a combination thereof.

Compositions may comprise one or more different types of amine catalyst.

In certain embodiments, compositions provided by the present disclosure comprise, in addition to a thiol-terminated polythioether, or a reaction product of any one of the reactions disclosed herein, or a combination of any of the foregoing, one or more additional thiol-terminated sulfur-containing adduct and/or prepolymers. A thiol-terminated sulfur-containing adduct and/or prepolymer can be any polymer having at least one sulfur atom in the repeating unit, including, but not limited to, polymeric thiols, polythiols, thioethers, polythioethers, polyformals, and polysulfides. A "thiol," as used herein, refers to a compound comprising a thiol or mercaptan group, that is, an "SH" group, either as the sole functional group or in combination with other functional groups, such as hydroxyl groups, as is the case with, for example, thioglycerols. A polythiol refers to such a compound having more than one SH group, such as a dithiol or higher functionality thiol. Such groups are typically terminal and/or pendant such that they have an active hydrogen that is reactive with other functional groups. As used herein, the term "polysulfide" refers to any compound that comprises a sulfur-sulfur linkage (—S—S—). A polythiol can comprise both a terminal and/or pendant sulfur (—SH) and a non-reactive sulfur atom (—S— or —S—S—). Thus, the term polythiol generally encompasses polythioethers and polysulfides. Examples of additional sulfur-containing polymers useful in compositions provided by the present disclosure include, for example, those disclosed in U.S. Pat. Nos. 6,172,179; 6,509,418; and 7,009,032; and in U.S. Application No. 2008/0200610. In certain embodiments, compositions provided by the present disclosure comprise a polythioether having the structure:

—R$^1$—[—S—(CH$_2$)$_2$—O—[—R$^2$—O—]$_m$—(CH$_2$)$_2$—S—R$^1$—]$_n$— wherein R$^1$ is selected from a C$_{2-6}$ alkanediyl, C$_{6-8}$ cycloalkanediyl, C$_{6-10}$ cycloalkylalkanediyl, —[(—CH$_2$—)$_s$—X—]$_q$—(—CH$_2$—)$_r$—, and —[(—CH$_2$—)$_s$—X—]$_q$—(—CH$_2$—)— in which at least one —CH$_2$— unit is substituted with a methyl group; R$^2$ is selected from C$_{2-6}$ alkanediyl, C$_{6-8}$ cycloalkanediyl, C$_{6-10}$ cycloalkylalkanediyl, and —[(—CH$_2$—)$_s$—X—]$_q$—(—CH$_2$—)$_r$—; X is selected from O, S, and —NR$^5$—, where R$^5$ is selected from hydrogen and methyl; m is an integer from 0 to 10; n is an integer from 1 to 60; p is an integer from 2 to 6; q is an integer from 1 to 5, and r is an integer from 2 to 10. Such polythioethers are described in U.S. Pat. No. 6,172,179 at col. 2, line 29 to col. 4, line 34.

The one or more additional sulfur-containing polymers may be difunctional or multifunctional, for example, having from 3 to 6 terminal groups, or a mixture thereof.

In certain embodiments, compositions provided by the present disclosure comprise from about 10 wt % to about 90 wt % of a sulfur-containing polymer provided by the present disclosure, from about 20 wt % to about 80 wt %, from about 30 wt % to about 70 wt %, and in certain embodiments from about 40 wt % to about 60 wt %, where wt % is based on the total weight of all non-volatile components of the composition (i.e., the dry weight).

As used herein, the term polysulfide refers to a polymer that contains one or more disulfide linkages, i.e., —[S—S]— linkages, in the polymer backbone and/or in pendant positions on the polymer chain. In certain embodiments, the polysulfide polymer will have two or more sulfur-sulfur linkages. Suitable polysulfides are commercially available, for example, from Akzo Nobel and Toray Fine Chemicals under the names Thiokol-LP and Thioplast®. Thioplast® products are available in a wide range of molecular weights ranging, for example, from less than 1,100 to over 8,000, with molecular weight being the average molecular weight in grams per mole. In some cases, the polysulfide has a number average molecular weight of 1,000 to 4,000. The crosslink density of these products also varies, depending on the amount of crosslinking agent used. The —SH content, i.e., thiol or mercaptan content, of these products can also vary. The mercaptan content and molecular weight of the polysulfide can affect the cure speed of the polymer, with cure speed increasing with molecular weight.

Polyformal prepolymers useful in aerospace sealant applications are disclosed, for example, in U.S. Application Publication No. 2012/0234205 and U.S. Application publication No. 2012/0238707.

In certain embodiments, the sulfur-containing polymer is selected from a polythioether and a polysulfide, and a combination thereof. In certain embodiments a sulfur-containing polymer comprises a polythioether, and in certain embodiments, a sulfur-containing polymer comprises a polysulfide. A sulfur-containing polymer may comprise a mixture of different polythioethers and/or polysulfides, and the polythioethers and/or polysulfides may have the same or different functionality. In certain embodiments, a sulfur-containing polymer has an average functionality from 2 to 6, from 2 to 4, from 2 to 3, and in certain embodiments, from 2.05 to 2.5. For example, a sulfur-containing polymer can be selected from a difunctional sulfur-containing polymer, a trifunctional sulfur-containing polymer, and a combination thereof.

Properties

For aerospace sealant applications it is desirable that a sealant meet the requirements of Mil-S-22473E (Sealant Grade C) at a cured thickness of 20 mils, exhibit an elongation greater than 200%, a tensile strength greater than 250 psi, and excellent fuel resistance, and maintain these properties over a wide temperature range from −67° F. to 360° F. (20° C. to 182° C.).

In certain embodiments, the curable composition has a pot life of at least 3 days, and in certain embodiments, at least 4 weeks at about 25° C.

In certain embodiments, the polyepoxy can be released from the encapsulant upon application of a thermal and/or mechanical stress for less than about 30 seconds, less than about 1 minute, or less than about 2 minutes. The release temperature can be greater than about 50° C., greater than about 70° C., and in certain embodiments, greater than about 90° C. In certain embodiments, the release temperature if from about from 50° C. to 200° C., from 80° C. to 120° C., and in certain embodiments, from 90° C. to 120° C. The elevated temperature can be applied with a radiant source such as an infrared heater, a heated platen, or by means of inductive heating. The elevated temperature may be applied to exposed surfaces of a sealant composition or to the sealant with the assembled surfaces. Mechanical stress includes, for example, impact, shear, grinding, and ultrasonics. The polyepoxy may be released from a microcapsule by shear forces during application to the surfaces to be bonded. The polyepoxy may be released from the shell encapsulant by impact to the assembled surfaces with the sealant applied. Also, in certain embodiments, ultrasound may be used to rupture the encapsulant shell to release the polyepoxy. For example, ultrasonic radiation may be directed at the sealant and/or surfaces to which the sealant is applied for a sufficient time at an appropriate frequency to release the polyepoxy from the microcapsules.

Formulations

Compositions provided by the present disclosure may comprise one or more additional components suitable for use in aerospace sealants and depend at least in part on the desired performance characteristics of the cured sealant under conditions of use.

In certain embodiments, compositions provided by the present disclosure comprise one or more than one adhesion promoters. A one or more additional adhesion promoter may be present in amount from 0.1 wt % to 15 wt % of a composition, less than 5 wt %, less than 2 wt %, and in certain embodiments, less than 1 wt %, based on the total dry weight of the composition. Examples of adhesion promoters include phenolics, such as Methylon® phenolic resin, and organosilanes, such as epoxy, mercapto or amino functional silanes, such as Silquest® A-187 and Silquest® A-1100. Other useful adhesion promoters are known in the art.

Compositions provided by the present disclosure may comprise one or more different types of filler. Suitable fillers include those commonly known in the art, including inorganic fillers, such as carbon black and calcium carbonate (CaCO$_3$), silica, polymer powders, and lightweight fillers. Suitable lightweight fillers include, for example, those described in U.S. Pat. No. 6,525,168. In certain embodiments, a composition includes 5 wt % to 60 wt % of the filler or combination of fillers, 10 wt % to 50 wt %, and in certain embodiments, from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

In certain embodiments, compositions provided by the present disclosure include low density filler particles. As used herein, low density, when used with reference to such particles means that the particles have a specific gravity of no more than 0.7, in certain embodiments no more than 0.25, and in certain embodiments, no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 to 100 microns and a specific gravity of 0.25 (Eccospheres®). Other examples include alumina/silica microspheres having particle sizes in the range of 5 to 300 microns and a specific gravity of 0.7 (Fillite®), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about 40 μm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). In certain embodiments, compositions provided by the present disclosure include lightweight filler particles comprising an exterior surface coated with a thin coating, such as those described in U.S. Publication No. 2010/0041839 at paragraphs [0016]-[0052], the cited portion of which is incorporated herein by reference.

In certain embodiments, a low density filler comprises less than 2 wt % of a composition, less than 1.5 wt %, less than 1.0 wt %, less than 0.8 wt %, less than 0.75 wt %, less than 0.7 wt % and in certain embodiments, less than 0.5 wt % of a composition, where wt % is based on the total dry solids weight of the composition.

In certain embodiments, compositions provided by the present disclosure comprise at least one filler that is effective in reducing the specific gravity of the composition. In certain embodiments, the specific gravity of a composition is from 0.8 to 1, 0.7 to 0.9, from 0.75 to 0.85, and in certain embodiments, is 0.8. In certain embodiments, the specific gravity of a composition is less than about 0.9, less than about 0.8, less than about 0.75, less than about 0.7, less than about 0.65, less than about 0.6, and in certain embodiments, less than about 0.55.

In certain embodiments, compositions provided by the present disclosure comprise an electrically conductive filler. Electrical conductivity and EMI/RFI shielding effectiveness can be imparted to composition by incorporating conductive materials within the polymer. The conductive elements can include, for example, metal or metal-plated particles, fabrics, meshes, fibers, and combinations thereof. The metal can be in the form of, for example, filaments, particles, flakes, or spheres. Examples of metals include copper, nickel, silver, aluminum, tin, and steel. Other conductive materials that can be used to impart EMI/RFI shielding effectiveness to polymer compositions include conductive particles or fibers comprising carbon or graphite. Conductive polymers such as polythiophenes, polypyrroles, polyaniline, poly(p-phenylene) vinylene, polyphenylene sulfide, polyphenylene, and polyacetylene can also be used.

Examples of electrically non-conductive fillers include materials such as, but not limited to, calcium carbonate, mica, polyamide, fumed silica, molecular sieve powder, microspheres, titanium dioxide, chalks, alkaline blacks, cellulose, zinc sulfide, heavy spar, alkaline earth oxides, alkaline earth hydroxides, and the like. Fillers also include high band gap materials such as zinc sulfide and inorganic barium compounds. In certain embodiments, an electrically conductive base composition can comprise an amount of electrically non-conductive filler ranging from 2 wt % to 10 wt % based on the total weight of the base composition, and in certain embodiments, can range from 3 wt % to 7 wt %. In certain embodiments, a curing agent composition can comprise an amount of electrically non-conductive filler ranging from less than 6 wt % and in certain embodiments ranging from 0.5% to 4% by weight, based on the total weight of the curing agent composition.

Fillers used to impart electrical conductivity and EMI/RFI shielding effectiveness to polymer compositions are well known in the art. Examples of electrically conductive fillers include electrically conductive noble metal-based fillers such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal-based materials can also be used and include, for example, non-noble metal-plated non-noble metals such as copper-coated iron particles or nickel plated copper; non-noble metals, e.g., copper, aluminum, nickel, cobalt; non-noble-metal-plated-non-metals, e.g., nickel-plated graphite and non-metal materials such as carbon black and graphite. Combinations of electrically conductive fillers can also be used to meet the desired conductivity, EMI/RFI shielding effectiveness, hardness, and other properties suitable for a particular application.

The shape and size of the electrically conductive fillers used in the compositions of the present disclosure can be any appropriate shape and size to impart EMI/RFI shielding effectiveness to the cured composition. For example, fillers can be of any shape that is generally used in the manufacture of electrically conductive fillers, including spherical, flake, platelet, particle, powder, irregular, fiber, and the like. In certain sealant compositions of the disclosure, a base composition can comprise Ni-coated graphite as a particle, powder or flake. In certain embodiments, the amount of Ni-coated graphite in a base composition can range from 40 wt % to 80 wt %, and in certain embodiments can range from 50 wt % to 70 wt %, based on the total weight of the base composition. In certain embodiments, an electrically conductive filler can comprise Ni fiber. Ni fiber can have a diameter ranging from 10 μm to 50 μm and have a length ranging from 250 μm to 750 μm. A base composition can comprise, for example, an amount of Ni fiber ranging from 2 wt % to 10 wt %, and in certain embodiments, from 4 wt % to 8 wt %, based on the total weight of the base composition.

Carbon fibers, particularly graphitized carbon fibers, can also be used to impart electrical conductivity to compositions of the present disclosure. Carbon fibers formed by vapor phase pyrolysis methods and graphitized by heat treatment and which are hollow or solid with a fiber diameter ranging from 0.1 micron to several microns, have high electrical conductivity. As disclosed in U.S. Pat. No. 6,184, 280, carbon microfibers, nanotubes or carbon fibrils having an outer diameter of less than 0.1 μm to tens of nanometers can be used as electrically conductive fillers. An example of graphitized carbon fiber suitable for conductive compositions of the present disclosure include Panex® 30MF (Zoltek Companies, Inc., St. Louis, Mo.), a 0.921 μm diameter round fiber having an electrical resistivity of 0.00055 Ω-cm.

The average particle size of an electrically conductive filler can be within a range useful for imparting electrical conductivity to a polymer-based composition. For example, in certain embodiments, the particle size of the one or more fillers can range from 0.25 μm to 250 μm, in certain embodiments can range from 0.25 μm to 75 μm, and in certain embodiments can range from 0.25 μm to 60 μm. In certain embodiments, composition of the present disclosure can comprise Ketjen Black EC-600 JD (Akzo Nobel, Inc., Chicago, Ill.), an electrically conductive carbon black characterized by an iodine absorption of 1000-11500 mg/g (J0/84-5 test method), and a pore volume of 480-510 cm$^3$/ 100 gm (DBP absorption, KTM 81-3504). In certain embodiments, an electrically conductive carbon black filler is Black Pearls 2000 (Cabot Corporation, Boston, Mass.).

In certain embodiments, electrically conductive polymers can be used to impart or modify the electrical conductivity of compositions of the present disclosure. Polymers having sulfur atoms incorporated into aromatic groups or adjacent to double bonds, such as in polyphenylene sulfide, and polythiophene, are known to be electrically conductive. Other electrically conductive polymers include, for example, polypyrroles, polyaniline, poly(p-phenylene) vinylene, and polyacetylene. In certain embodiments, the sulfur-containing polymers forming a base composition can be polysulfides and/or polythioethers. As such, the sulfur-containing polymers can comprise aromatic sulfur groups and sulfur atoms adjacent to conjugated double bonds such as vinylcyclohexene-dimercaptodioxaoctane groups, to enhance the electrical conductivity of the compositions of the present disclosure.

Compositions of the present disclosure can comprise more than one electrically conductive filler and the more than one electrically conductive filler can be of the same or different materials and/or shapes. For example, a sealant composition can comprise electrically conductive Ni fibers, and electrically conductive Ni-coated graphite in the form of powder, particles or flakes. The amount and type of electrically conductive filler can be selected to produce a sealant composition which, when cured, exhibits a sheet resistance (four-point resistance) of less than 0.50 Ω/cm$^2$, and in certain embodiments, a sheet resistance less than 0.15 Ω/cm$^2$. The amount and type of filler can also be selected to provide effective EMI/RFI shielding over a frequency range of from 1 MHz to 18 GHz for an aperture sealed using a sealant composition of the present disclosure.

Galvanic corrosion of dissimilar metal surfaces and the conductive compositions of the present disclosure can be minimized or prevented by adding corrosion inhibitors to the composition, and/or by selecting appropriate conductive fillers. In certain embodiments, corrosion inhibitors include strontium chromate, calcium chromate, magnesium chromate, and combinations thereof. U.S. Pat. No. 5,284,888 and U.S. Pat. No. 5,270,364 disclose the use of aromatic triazoles to inhibit corrosion of aluminum and steel surfaces. In certain embodiments, a sacrificial oxygen scavenger such as Zn can be used as a corrosion inhibitor. In certain embodiments, the corrosion inhibitor can comprise less than 10% by weight of the total weight of the electrically conductive composition. In certain embodiments, the corrosion inhibitor can comprise an amount ranging from 2% by weight to 8% by weight of the total weight of the electrically conductive composition. Corrosion between dissimilar metal surfaces can also be minimized or prevented by the selection of the type, amount, and properties of the conductive fillers comprising the composition.

In certain embodiments, a thiol-terminated polythioether may comprises from about 50 wt % to about 90 wt % of a composition, from about 60 wt % to about 90 wt %, from about 70 wt % to about 90 wt %, and in certain embodiments, from about 80 wt % to about 90 wt % of the composition, where wt % is based on the total dry solids weight of the composition.

Uses

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. In certain embodiments, sealant compositions provided by the present disclosure are useful, e.g., as aerospace sealants and as linings for fuel tanks.

In certain applications, a sealant composition is used to provide a seal between two panels such as, for example, aluminum panels. For example, in such applications, the cured thickness of the sealant can be about 20 mils and exhibit an elongation greater than 200%, a tensile strength greater than 250 psi, exhibit excellent fuel resistance, and be thermally stable from about −70° F. to about 360° F.

In certain embodiments, the thickness of the cured sealant can be from about 5 mils to about 40 mils, from about 10 mils to about 30 mils, from about 15 mils to about 25 mils, and in certain embodiments, about 17 mils to about 23 mils.

In certain embodiments, the un-activated sealant composition is stable for at least 24 hours, at least 3 days, 4 days, at least 8 days, at least 12 days, and in certain embodiments, at least 16 days after formulation.

It is desirable that at the time of intended use, the system be activated rapidly and at moderate temperature and/or force. For example, when the system is thermally activated, the heat can be applied for less than 200 seconds, less than 150 seconds, less than 100 seconds, and in certain embodiments, less than 50 seconds. In certain embodiments, the epoxy is released from the encapsulant ultrasonically using, for example, a pressure of 30 psi at 20 KHz for 200 milliseconds. Alternatively, an impact, shear, and/or grinding force may be applied a sealant layer between two panels to trigger curing.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. In certain embodiments, compositions provided by the present disclosure may be applied to a coating on a substrate, such as a polyurethane coating.

Compositions provided by the present disclosure may be applied directly onto the surface of a substrate or over an underlayer by any suitable coating process known to those of ordinary skill in the art.

Furthermore, methods are provided for sealing an aperture utilizing a composition provided by the present disclosure. These methods comprise, for example, applying a composition provided by the present disclosure to a surface to seal an aperture, and curing the composition. In certain embodiments, a method for sealing an aperture comprises (a) applying a sealant composition provided by the present disclosure to one or more surfaces defining an aperture, (b) assembling the surfaces defining the aperture, (c) applying energy to release the polyepoxy from the encapsulant, and (d) curing the sealant, to provide a sealed aperture. Curing the sealant includes allowing the sealant to cure at ambient temperature without affirmatively accelerating the curing process. In certain embodiments, methods comprise a) applying a sealant composition provided by the present disclosure to one or more surfaces defining an aperture, and (b) applying energy to release the polyepoxy from the encapsulant.

In certain embodiments, a composition may be cured under ambient conditions after activation, where ambient conditions refers to a temperature from 20° C. to 25° C., and atmospheric humidity. In certain embodiments, a composition may be cured under conditions encompassing a temperature from a 0° C. to 100° C. and humidity from 0% relative humidity to 100% relative humidity. In certain embodiments, a composition may be cured at a higher temperature such as at least 30° C., at least 40° C., and in certain embodiments, at least 50° C. In certain embodiments, a composition may be cured at room temperature, e.g., 25° C. In certain embodiments, a composition may be cured upon exposure to actinic radiation, such as ultraviolet radiation. As will also be appreciated, the methods may be used to seal apertures on aerospace vehicles including aircraft and aerospace vehicles.

In certain embodiments, a composition achieves a tack-free cure in less than about 6 hours, in less than about 12 hours, less than about 18 hours, less than about 24 hours, and in certain embodiments, less than about 48 hours, after the polyepoxy has been released from the encapsulant.

Cured compositions disclosed herein, such as cured sealants, exhibit properties acceptable for use in aerospace applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated herein by reference. It is also desirable that, when cured, compositions of the present disclosure used in aviation and aircraft applications exhibit a percent volume swell not greater than 25% following immersion for one week at 60° C. (140° F.) and ambient pressure in JRF type I. Other properties, ranges, and/or thresholds may be appropriate for other sealant applications.

In certain embodiments, therefore, compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). Jet Reference Fluid JRF Type I, as employed for determination of fuel resistance, has the following composition: toluene: 28 ±1% by volume; cyclohexane (technical): 34±1% by volume; isooctane: 38±1% by volume; and tertiary dibutyl disulfide: 1±0.005% by volume (see AMS 2629, issued Jul. 1, 1989, §3.1.1 etc., available from SAE (Society of Automotive Engineers)).

In certain embodiments, compositions provided herein provide a cured product, such as a sealant, exhibiting a tensile elongation of at least 100% and a tensile strength of at least 400 psi when measured in accordance with the procedure described in AMS 3279, §3.3.17.1, test procedure AS5127/1, §7.7.

In certain embodiments, compositions provide a cured product, such as a sealant, that exhibits a lap shear strength of greater than 200 psi, such as at least 220 psi, at least 250 psi, and, in some cases, at least 400 psi, when measured according to the procedure described in SAE AS5127/1 paragraph 7.8.

In certain embodiments, a cured sealant comprising a composition provided by the present disclosure meets or exceeds the requirements for aerospace sealants as set forth in AMS 3277.

Apertures, including apertures of aerospace vehicles, sealed with compositions provided by the present disclosure are also disclosed.

In certain embodiments, an electrically conductive sealant composition provided by the present disclosure exhibits the following properties measured at room temperature following exposure at 500° F. for 24 hours: a surface resistivity of less than 1 ohms/square, a tensile strength greater than 200 psi, an elongation greater than 100%, and a cohesive failure of 100% measured according to MIL-C-27725.

In certain embodiments, a cured sealant provided by the present disclosure exhibits the following properties when cured for 2 days at room temperature, 1 day at 140° F., and 1 day at 200° F.: a dry hardness of 49, a tensile strength of 428 psi, and an elongation of 266%; and after 7 days in JRF, a hardness of 36, a tensile strength of 312 psi, and an elongation of 247%.

In certain embodiments, compositions provided by the present disclosure exhibit a Shore A hardness (7-day cure) greater than 10, greater than 20, greater than 30, and in certain embodiments, greater than 40; a tensile strength greater than 10 psi, greater than 100 psi, greater than 200 psi, and in certain embodiments, greater than 500 psi; an elongation greater than 100%, greater than 200%, greater than 500%, and in certain embodiments, greater than 1,000%; and a swell following exposure to JRF (7 days) less than 20%.

EXAMPLES

Embodiments provided by the present disclosure are further illustrated by reference to the following examples, which describe compositions including thiol-terminated polythioethers and encapsulated epoxies and the uses of such compositions. It will be apparent to those skilled in the art that many modifications, both to materials, and methods, may be practiced without departing from the scope of the disclosure.

Example 1

Microencapsulated Epoxy Sealant Composition

Mixing was performed in a plastic container with a lid. Permapol® P3.1E (15.58 g, a thiol-terminated polythioether available from PRC-Desoto International, Inc, Sylmar, Calif.), calcium carbonate (8.00 g), triethylene diamine (0.231 g), and Lipocapsule™ LT-81381 (3.64 g, an encapsulated epoxy resin, available from Lipo Technologies) were added to the container. The container was placed in a speed mixer (DAC 600 FVZ) and mixed for 30 seconds at 2,300 rpm.

A portion of the mixed material was left inside the plastic container at room temperature. After 4 weeks, the mixture remained liquid and no curing was apparent. A second portion of the mixed material was ground in a porcelain mortar for 30 minutes. The material formed a solid elastomer after 3 weeks with a hardness value of 15 Shore A. A third portion of the mixed material was applied onto the thread of a bolt. The bolt was screwed into a matching nut. Through the mechanical shear associated with threading, the material formed a solid elastomer in 24 hours.

The solid elastomer was further immersed in Jet Reference Fluid Type I for 7 days at 140° F. The volume swell was 24% and the weight loss was 3.4%, measured according to SAE AS 5127.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:
1. A curable aerospace sealant composition comprising:
(a) 40 wt % to 60 wt % of a thiol-terminated polythioether, wherein the thiol-terminated polythioether comprises a thiol-terminated polythioether comprising the structure of Formula (1);

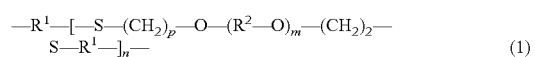

(1)

wherein:
each $R^1$ independently comprises $C_{2-10}$ alkanediyl, $C_{6-8}$ cycloalkanediyl, $C_{6-14}$ alkanecycloalkanediyl, $C_{5-8}$ heterocycloalkanediyl, or —[(—$CHR^3$—)$_s$—X—]$_q$—(—$CHR^3$—)$_r$—, wherein:
s is an integer from 2 to 6;
q is an integer from 0 to 5;
r is an integer from 2 to 10;
each $R^3$ independently comprises hydrogen or methyl; and
each X is independently selected from —O—, —S—, and —$NR^6$—, wherein $R^6$ is selected from hydrogen and methyl;
each $R^2$ independently comprises $C_{1-10}$ alkanediyl, $C_{6-8}$ cycloalkanediyl, $C_{6-14}$ alkanecycloalkanediyl, or —[(—$CHR^3$—)$_s$—X—]$_q$—(—$CHR^3$—)$_r$—,
wherein s, q, r, $R^3$, and X are as defined as for $R^1$;
m is an integer from 0 to 50;

n is an integer from 1 to 60; and
p is an integer from 2 to 6;
(b) 0.5 wt. % to 20 wt. % microcapsules comprising a polymeric shell and a polyepoxy suspended in a solvent, wherein,
the polymeric shell comprises a gelatin and polyoxymethylene urea; and
the polyepoxy comprises a bisphenol A/epichlorohydrin-derived epoxy resin; and
(c) an amine catalyst, wherein the amine catalyst comprises triethylene diamine 1,8-diazabicycloundec-7-ene (DBU), 1,4-diazabicyclo[2.2.2]octane (DABCO), isophorone diamine (IPDA), and a $C_{6-10}$ primary amine, or a combination of any of the foregoing,
wherein wt % is based on the total solids weight of the curable composition.

2. The composition of claim 1, wherein the thiol-terminated polythioether (a) comprises a thiol-terminated polythioether of Formula (2), a thiol-terminated polythioether of Formula (2a), or a combination thereof:

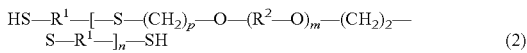

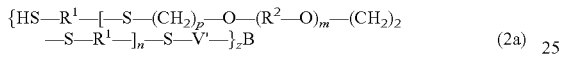

wherein:
each $R^1$ independently comprises $C_{2-10}$ alkanediyl, $C_{6-8}$ cycloalkanediyl, $C_{6-14}$ alkanecycloalkanediyl, $C_{5-8}$ heterocycloalkanediyl, or —[(—CHR$^3$—)$_s$—X—]$_q$—(—CHR$^3$—)$_r$—, wherein:
s is an integer from 2 to 6;
q is an integer from 1 to 5;
r is an integer from 2 to 10;
each $R^3$ independently comprises hydrogen or methyl; and
each X independently comprises —O—, —S—, or —NR—, wherein R is selected from hydrogen and methyl;
each $R^2$ independently comprises $C_{1-10}$ alkanediyl, $C_{6-8}$ cycloalkanediyl, $C_{6-14}$ alkanecycloalkanediyl, or —[(—CHR$^3$—)$_s$—X—]$_q$—(—CHR$^3$—)$_r$—,
wherein s, q, r, $R^3$, and X are as defined as for $R^1$;
m is an integer from 0 to 50;
n is an integer from 1 to 60;
p is an integer from 2 to 6;
B represents a core of a z-valent, vinyl-terminated polyfunctionalizing agent B(—V)$_z$ wherein:
z is an integer from 3 to 6; and
each V is a group comprising a terminal vinyl group; and
each —V'— is derived from the reaction of —V with a thiol.

3. The composition of claim 1, wherein the polyepoxy is capable of being released from the microcapsules by application of energy comprising heat, a mechanical force, ultrasonics, or a combination of any of the foregoing.

4. The composition of claim 1, wherein the polyepoxy is capable of being released from the microcapsules at a temperature from 80° C. to 120° C.

5. The composition of claim 1, wherein the polyepoxy comprises a polyepoxy having a molecular weight from 200 Daltons to 2,000 Daltons.

6. The composition of claim 1, comprising an additional thiol-terminated sulfur-containing prepolymer.

7. The composition of claim 6, wherein the additional thiol-terminated sulfur-containing prepolymer comprises a thiol-terminated polythioether, a thiol-terminated polysulfide, a thiol-terminated polyformal, or a combination of any of the foregoing.

8. The composition of claim 1, wherein the composition is characterized by a pot life of at least 24 hours.

9. The composition of claim 1, formulated as a sealant.

10. A method of sealing a surface comprising:
(a) applying the composition of claim 9 to a surface; and
(b) applying energy to release the polyepoxy from the microcapsules to seal the surface.

11. The method of claim 10, wherein applying energy comprises applying thermal energy.

12. A surface sealed with the composition of claim 9.

13. The method of claim 10, wherein applying energy comprises applying mechanical energy.

14. The curable composition of claim 1, further comprising from 10 wt % to 50 wt % of a filler.

15. The curable composition of claim 1, wherein the amine catalyst comprises triethylene diamine.

16. A curable aerospace sealant composition comprising:
(a) 40 wt % to 60 wt % of a thiol-terminated polythioether, wherein the thiol-terminated polythioether comprises a thiol-terminated polythioether comprising the structure of Formula (1);

$$—R^1—[—S—(CH_2)_p—O—(R^2—O)_m—(CH_2)_2—S—R^1—]_n— \qquad (1)$$

wherein:
each $R^1$ independently comprises $C_{2-10}$ alkanediyl, $C_{6-8}$ cycloalkanediyl, $C_{6-14}$ alkanecycloalkanediyl, $C_{5-8}$ heterocycloalkanediyl, or —[(—CHR$^3$—)$_s$—X—]$_q$—(—CHR$^3$—)$_r$—, wherein:
s is an integer from 2 to 6;
q is an integer from 0 to 5;
r is an integer from 2 to 10;
each $R^3$ independently comprises hydrogen or methyl; and
each X is independently selected from —O—, —S—, and —NR$^6$—, wherein $R^6$ is selected from hydrogen and methyl;
each $R^2$ independently comprises $C_{1-10}$ alkanediyl, $C_{6-8}$ cycloalkanediyl, $C_{6-14}$ alkanecycloalkanediyl, or —[(—CHR$^3$—)$_s$—X—]$_q$—(—CHR$^3$—)$_r$—,
wherein s, q, r, $R^3$, and X are as defined as for $R^1$;
m is an integer from 1 to 50;
n is an integer from 1 to 60; and
p is an integer from 2 to 6;
(b) 0.5 wt % to 20 wt % microcapsules comprising a polymeric shell and a polyepoxy suspended in a solvent, wherein,
the polymeric shell comprises a gelatin and polyoxymethylene urea; and
the polyepoxy comprises a bisphenol A/epichlorohydrin-derived epoxy resin; and
(c) an amine catalyst,
wherein wt % is based on the total solids weight of the curable composition.

* * * * *